United States Patent Office 3,344,038
Patented Sept. 26, 1967

3,344,038
RESOLUTION OF RACEMIC STEROIDS
George Greenspan, Narberth, Leland L. Smith, Paoli, Theodore J. Foell, King of Prussia, and Richard Rees, Newtown Square, Pa., assignors to American Home Products Corporation, New York, N.Y., a corporation of Delaware
No Drawing. Filed Oct. 23, 1963, Ser. No. 318,155
4 Claims. (Cl. 195—51)

ABSTRACT OF THE DISCLOSURE

The A-rings of $\Delta^4$-3-ketones of the gonane series are aromatized by subjecting the said ketogonanes to the fermentation action of *Corynebacterium hoagii*. If the substrate contains a hydroxymethylene group at C–17, A-ring-aromatized resolved steroid products of the *d*- and *l*-configurations are obtained.

---

This invention relates to a new method of producing from $\Delta^4$-3-keto-steroids new steroids characterized in having an aromatized A-ring. Additionally the present invention includes the method of microbiologically resolving racemic steroids to produce desired resolved steroid products of *d*- and *l*-configurations.

In copending application Ser. No. 297,656, filed July 25, 1963, now U.S. Patent 3,189,528, there is disclosed a novel method of resolving racemic steroids of selected configuration. The process therein described utilizes a bacterium of the genus *Corynebacterium*, specifically *Corynebacterium simplex*. The products of the fermentation described are characterized as resolved steroids of *d*-configuration. The advantages of such a separation or resolution process are obvious since it provides a means of obtaining from a racemic mixture that particular steroid species which has properties making it the most desired and useful species.

The method of the present invention, viewed in its broadest aspect, while somewhat similar to the invention referred to above, is distinguishable therefrom in that while a different microorganism is used, namely *Corynebacterium hoagii*, to provide the desired transformation of the A-ring of the starting racemic mixture, additionally and quite unexpectedly, the microbiological resolution of the present invention results in compounds of both *d*-configuration and *l*-configuration, when utilizing the same starting materials as utilized in the application referred to. The reasons for this unexpected result are apparently due to the organism *Corynebacterium hoagii* having enzymes capable of transforming both *d*- and *l*-forms of the steroid substrate.

According to the present invention, it has now been found that a microbiological dehydrogenation carried out on racemic $\Delta^4$-3-ketones of the gonane series and more specifically on racemic 13$\beta$-alkyl-17-substituted-gon-4-ene-3-ones by the fermentation action of *Corynebacterium hoagii* results in the production of both 17$\beta$-hydroxy and 17 - keto - 13$\beta$ - alkyl - gona-1,3,5(10)-trienes having *l*- and *d*-configurations respectively. These products may then be separated by chromatography or other conventional separation means for use as biologically active steroids. The products obtained according to the process of the present invention have estrogenic and lipodiatic activities and are therefore useful as hormones.

The method of the present invention may be described in its broadest aspect by the following reaction sequence:

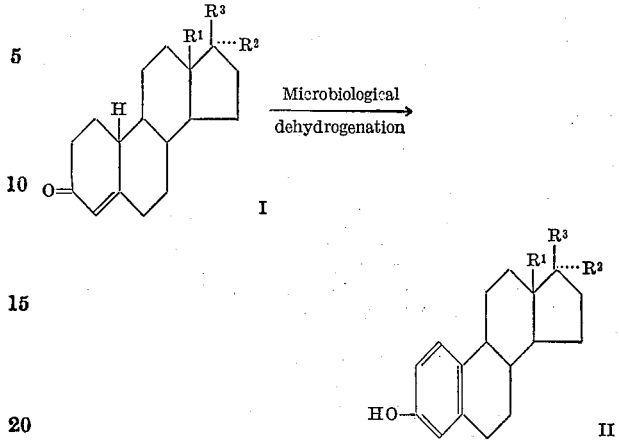

wherein, in the racemic starting material I, $R^1$ is lower alkyl; $R^2$ is selected from the group consisting of hydrogen, lower alkyl, lower alkynyl and lower alkenyl; $R^3$ is OH and $R^2$ and $R^3$ taken together are =O(keto). In the steroid products encompassed within II, $R^1$, $R^2$ and $R^3$ have the values previously ascribed and as in I $R^2$ and $R^3$ taken together are =O(keto).

According to the reaction sequence shown, both resolved and unresolved products encompassed within Formula II will be obtained depending on the substituent represented by $R^1$ and $R^2$. When $R^2$ is hydrogen, resolved products are obtained. That is, the products will have *d*- and *l*-configurations. This unique result gives rise to one of the process aspects of the present invention and its objective of providing resolved steroid products. When $R^2$ is not hydrogen in starting compound I and is one of the other defined substituents, transformation products are obtained, i.e. aromatized products are obtained, but they are racemic. This result is therefore another aspect of the present invention, namely the production of steroid structures of aromatized A-ring configuration. This latter result is to be contrasted with the result obtained according to the method described in the copending application referred to wherein the transformation products are resolved. A further and added feature of the present invention is that it makes possible the production of specific steroid products of particular configuration from starting materials from which they could not previously be obtained.

As has been noted, the starting materials encompassed within structure I are racemic. These starting steroid racemic mixtures are obtained according to the method described in copending application Ser. No. 228,384, filed Oct. 4, 1962, and also in Belgian Patents 608,370 and 608,369 and the patents cited therein.

In order to effect conversion of the selected racemic steroids of the type encompassed within those defined by Formula I above, it is necessary that the racemic mixture be acted upon by the microorganism *Corynebacterium hoagii* as has been described. The desired growth of *Corynebacterium hoagii* (American Type Culture Collection 7005), utilized in the process of this invention, is accomplished in a suitable nutrient medium containing carbohydrate, organic nitrogen and inorganic salt in accordance with well-known technique. The racemic steroid starting material is then dissolved or suspended in solvent such as ethanol, acetone or any other water-miscible solvent which is non-toxic toward the organism, and added to the cultivated microorganism in a broth medium. This culture is then shaken, aerated or simultaneously aerated and agitated, in order to enhance the growth of *Corynebacterium hoagii* and the biochemical conversion of the steroid substrate. The steroid may be added to the broth medium and then inoculated with the bacterium, or the cultivated microorganism in broth medium may be added to the steroid. In certain cases, depending on the conditions of the reaction medium, it may be more desirable to obtain optimum growth of the microorganism before the addition of the steroid.

A useful method for carrying out the process of the present invention in the cultivation of *Corynebacterium hoagii* in a suitable nutrient medium under aerobic conditions. A suitable volume of the cell suspension is then seeded into nutrient media of the same or altered composition for supporting growth of the microorganism. The nutrient medium employed may be a yeast extract-dextrose medium, casein hydrolysate, corn steep liquor, water extract of soybean meal or lactalbumin hydrolysate together with an appropriate carbon source.

The addition of inorganic salts may be desirable to maintain a pH level in the reaction medium of between 6.8 and 7.2. If the use of inorganic salts for buffering the reaction mixture is omitted, a pH rise from an initial value of 6.8 to about 7.7–8 may be noted. The optimum temperature for growth of the selected microorganism is 28° C., but the temperature may vary between 25° and 37° C., and even between 20° and 40° C. without adversely affecting the microorganism, if the higher temperature is not maintained over long periods of time. The time of reaction may vary from as little as 3 hours to as much as 120 hours and will depend on the steroid being added. Any water miscible, non-toxic (to the organism) solvent may be employed to dissolve or suspend the steroid. Preferable solvents are ethanol and acetone, either of which may be used in such amounts that the final concentration of these solvents in the reaction mixture is no higher than about 7% and may amount to only traces. Due to evaporation, the final concentration of the organic solvent may be substantially zero.

Recovery of the desired steroid product is accomplished by extraction with a suitable water immiscible solvent followed by filtration or other of the commonly used precedures practiced in the art of steroid recovery under similar conditions. Separation and recovery of purified products is accomplished by chromatorgaphy, fractional crystallization, counter-current distribution, or other conventional separation techniques. When solvent extraction is used to recover the steroid product, chlorinated lower hydrocarbons, esters, ketons or alcohols may be used. Suitable solvents are chloroform, methylene chloride, trichloroethane, ethylene dichloride, ethyl acetate, butanol, diethylketone, methyl isobutyl ketone and the like.

Reference now to the specific examples which follow will provide a better understanding of the present invention and particularly the manner in which fermentation by the selected *Corynebacterium hoagii* organism is carried out. Variations in the manner in which this microorganism can be prepared and used according to the method of the present invention are also described.

*Example I*

An agar slant of *Corynebacterium hoagii* ATCC 7005 is washed with 5 ml. of distilled water and one ml. of the bacterial suspension transferred to a 250 ml. flask with 50 ml. of medium of the following composition: yeast extract 1%, dextrose 1%, and distilled $H_2O$ 100 ml. The flask is incubated for 24 hours on a reciprocating shaker at 28° C., after which 10% transfers are made to triplicate flasks of the same medium. Shaking on the reciprocating shaker for 24 hours is followed by the addition of *dl*-13β-ethyl-17β-hydroxy-gon-4-en-3-one in MeOH to give concentrations of 0.4, 0.6, and 0.8 g./l. respectively in the three flasks. The transformation stage is carried out on a rotary shaker, 250 r.p.m., 28° C.

At 24 hours, 5 ml. samples are taken, each extracted with 1 ml. methyl-isobutyl-ketone and the extracts spotted on No. 4 Whatman paper. The papergram is run off in the toluene-propylene glycol system. After drying, the papergram is sprayed with a mixture of equal parts of $K_3Fe(CN)_6$ and $FeCl_3$ solutions, 1% each. Four products, all positive to the Turnbull blue stain, are observed at each concentration; only a trace of substrate remains at 0.8 g./l. The two largest products are 13β-ethylgona-1,3,5(10)-triene-3,17β-diol and 13β-ethyl-3-hydroxygona-1,3,5(10)-trien-17-one.

*Example II*

The surface of an agar slant of *Corynebacterium hoagii* ATCC 7005 is washed with 5 ml. of distilled water. Half of the volume of suspended cells is added to each of two one l. flasks, each containing 200 ml. of the medium described in Example I. Incubation is carried out on the reciprocating shaker, 28° C. After 24 hours of growth, 9% transfers are made to 12 1-liter flasks with 200 ml. of the same medium. Incubation proceeds as before for 24 hours, when *dl*-13β-ethyl-17β-hydroxygon-4-en-3-one, dissolved in EtOH, is added to the flasks to give a concentration of 0.8 g./l.

Sampling at 24 hours and processing of samples as in Example I reveals the four products noted in Example I, plus a small amount of remaining substrate. The flasks are harvested at 28 hours, a total of 1.89 g. of *dl*-13β-ethyl-17β-hydroxygon-4-en-3-one having been fermented.

*Example III*

Inoculum and fermentation flasks are prepared as in Example I. *dl*-13β,17α-diethyl-17β-hydroxygon-4-en-3-one is added in EtOH at a 0.2 and 0.4 g./l.

The conversion flasks are incubated on a rotary shaker, 250 r.p.m., 28° C. and sampled at 24 and 48 hours. Four phenolic and 2 UV absorbing products are disclosed on papergrams at each concentration of steroid employed, at both 24 and 48 hours. The major product is 13β,17α-diethylgonal-1,3,5(10)-triene-3,17β-diol.

*Example IV*

Following the procedure described in Example III another conversion was carried out under similar conditions utilizing a medium comprised of 3.0 g. beef extract, 5.0 g. peptone and 1,000 ml. distilled water. The same product is obtained as in Example III.

*Example V*

Ten inoculum flasks are prepared and incubated as in Example II. At 25 hours, 7% transfers are made to 44 2-liter flasks and 15 1-liter flasks containing 400 and 200 ml. respectively of the same medium. Further incubation is performed on the reciprocating shaker. After 19 hours of shaking, *dl*-13β,17α-diethyl-17β-hydroxygon-4-en-3-one dissolved in MeOH is added to each flask to give a concentration of 0.35 g./l. The transformation stage is carried out on rotary shakers at 26 and 28° C.

The course of the conversion is followed by means of paper chromatography as described above. The flasks, with a total of 7.177 g. of starting material, are harvested at 47 hours. The product obtained is 13β,17α-diethyl-gonal-1,3,5(10)-triene-3,17β-diol.

*Example VI*

Following the procedure outlined in Example II, racemic 13β-ethyl-17α-ethynyl-17β-hydroxygon-4-en-3-one is transformed by *Corynebacterium hoagii* into 13β-ethyl-17α-ethynylgona-1,3,5(10)-triene-3,17β-diol, which is recovered from the harvested fermentation broth by extraction with ethyl acetate, concentration of the extracts, and chromatography of the residue thereby obtained on silica gel columns. The selected fractions containing product eluted from the column are combined, evaporated, and pure 13β-ethyl-17α-ethynylgona-1,3,5(10)-triene-3,17β-diol is thereby recovered.

Example VII

Following the procedure described in Example II, racemic 17β-hydroxy-17α-methyl-13β-propylgon-4-en-3-one is fermented with *Corynebacterium hoagii*. The harvested fermentation broth is extracted according to Example VI, and the combined extracts are reduced in volume, and chromatographed on silica gel. The product is eluted with ethyl acetate-benzene mixture, affording pure 17α-methyl-13β-propylgona-1,3,5(10)-triene-3,17β-diol.

Example VIII

The broth obtained in Example II is extracted three times with an equal volume of ethyl acetate. The combined ethyl acetate extracts are evaporated under diminished pressure and the residue (1.5 g.) is chromatographed on silica gel using 5% ethyl acetate in benzene to elute products. Initial fractions yielded 200 mg. of d-13β-ethyl-3-hydroxygona-1,3,5(10)-trien-17-one which is crystallized from methanol and chloroform. After sublimation, the product melts at 220–242° C.

Further elution of the column affords 420 mg. of mixed fractions, followed by 167 mg. of pure *l*-13β-ethylgona-1,3,5(10)-triene-3,17β-diol, which sublimes, M.P. 186–188° C.; [α]_D —55.2°.

Example IX

A harvested fermentation broth obtained by the action of *Corynebacterium hoagii* on racemic 17β-hydroxy-13β-propyl-17α-vinylgon-4-en-3-one is extracted with ethyl acetate, the extracts washed with water, dried, and concentrated under vacuum. The residue is chromtographed on silica gel columns, and the desired product fractions, eluted with ethyl acetate-benzene mixtures, are combined and evaporated under vacuum, thus affording the pure product, 13β-propyl-17α-vinylgona - 1,3,5(10) - triene-3,17β-diol.

Example X

A harvested broth obtained by the action of *Corynebatcerium hoagii* on 7.1 g. of *dl*-13β,17α-diethyl-17β-hydroxygon-4-en-3-one as in Example V is extracted with ethyl acetate several times, the ethyl acetate extracts combined together and reduced in volume under vacuum. The residue thereby obtained, is subjected to column chromatography on silica gel and affords 700 mg. of *dl*-13β,17α-diethyl-gona-1,3,5(10)-triene-3,17β-diol; M.P. 170–193° C.; [α]_D 0°.

Example XI

Following the procedure of Example II, racemic 17β-hydroxy-13β-propylgon-4-en-3-one is fermented with *Corynebacterium hoagii*. The harvested fermentation broth is extracted according to Example VI and the combined extracts are reduced in volume, and chromatographed on silica gel. The product is eluted with ethyl acetate-benzene mixture, affording pure 13β-propylgona-1,3,5(10)-triene-3,17β-diol.

While the method of the present invention including its various aspects has been described with some degree of particularity in the foregoing discussion and in the specific examples, it is to be understood that nothing construed therein is to be construed as a limitation on the scope of this invention. The latter is to be limited only by the claims appended hereto.

The invention claimed is:

1. The method of aromatizing the A-ring and resolving racemic steroids which comprises fermenting a racemic steroid having the formula

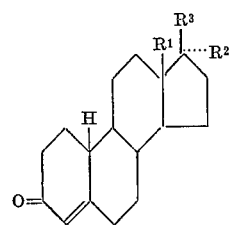

wherein $R^1$ is lower alkyl; $R^2$ is hydrogen and $R^3$ is hydroxy with *Corynebacterium hoagii* and recovering the A-ring-aromatized resolved products of both *d*-configuration and *l*-configuration.

2. The method of resolving racemic steroids according to the method of claim 1 wherein the racemic steroid fermented is *dl*-13β-ethyl-17β-hydroxygon-4-en-3-one.

3. The method of resolving racemic steroids according to the method of claim 1 wherein the racemic steroid fermented is *dl*-13β-propyl-17β-hydroxygon-4-en-3-one.

4. The method of resolving racemic steroids as claimed in claim 2 wherein *l*-13β-ethylgona-1,3,5(10)-triene-3,17β-diol and *d*-13β-ethyl-3-hydroxygona-1,3,5(10)-trien-17-one are obtained as products of the resolution.

References Cited

UNITED STATES PATENTS

| | | | |
|---|---|---|---|
| 2,928,850 | 3/1960 | Herzog et al. | 195—51 X |
| 3,189,528 | 6/1965 | Smith et al. | 195—51 |

OTHER REFERENCES

Derwent Belgian Patents Report, vol. 88A section 3, pp. 1 and 2, 1962.

ALVIN E. TANENHOLTZ, *Primary Examiner*.